US011571840B2

(12) United States Patent
Walter

(10) Patent No.: US 11,571,840 B2
(45) Date of Patent: Feb. 7, 2023

(54) REUSABLE COUNTERTOP MOLD FOR FORMING COUNTERTOP OVERHANGS

(71) Applicant: Gregory Walter, Shorewood, IL (US)

(72) Inventor: Gregory Walter, Shorewood, IL (US)

( * ) Notice: Subject to any disclaimer, the term of this patent is extended or adjusted under 35 U.S.C. 154(b) by 91 days.

(21) Appl. No.: 17/092,229

(22) Filed: Nov. 7, 2020

(65) Prior Publication Data

US 2022/0143876 A1 May 12, 2022

(51) Int. Cl.
*B29C 33/48* (2006.01)
*B29C 33/14* (2006.01)
*B29C 39/34* (2006.01)
*B29D 99/00* (2010.01)
*B29C 33/30* (2006.01)
*B29L 31/44* (2006.01)

(52) U.S. Cl.
CPC .............. *B29C 33/48* (2013.01); *B29C 33/14* (2013.01); *B29C 33/305* (2013.01); *B29C 39/34* (2013.01); *B29D 99/0039* (2013.01); *B29L 2031/441* (2013.01)

(58) Field of Classification Search
CPC ....... B29C 33/14; B29C 33/305; B29C 33/48; B29C 33/485; B29C 39/26; B29C 39/34; B29D 99/0039; B29L 2031/44; B29L 2031/441
USPC ................. 52/742.1, 742.12, 742.13, 742.14
See application file for complete search history.

(56) References Cited

U.S. PATENT DOCUMENTS

| 4,574,017 A * | 3/1986 | Stegmeier ............... E04H 4/141 156/247 |
| 4,625,343 A * | 12/1986 | Bumgarner, Sr. ....... E04H 4/141 249/DIG. 3 |
| 5,260,007 A * | 11/1993 | Efstratis ............. B29D 99/0039 264/261 |
| 6,338,229 B1 * | 1/2002 | Botzen .................. E04F 19/061 52/287.1 |
| 7,001,558 B2 * | 2/2006 | Baldoni .................. B29C 33/40 249/117 |
| 8,834,767 B1 * | 9/2014 | Williamson ........ B29C 37/0032 264/308 |
| 9,289,923 B1 * | 3/2016 | Grzeskowiak, II ..... B28B 7/007 |

(Continued)

*Primary Examiner* — William V Gilbert
(74) *Attorney, Agent, or Firm* — Donald G. Flaynik

(57) ABSTRACT

A reusable countertop mold in accordance with the present invention includes a bracket member detachably secured to a rail portion of a cabinet member for a substantially horizontal substrate that receives deformable material upon a surface of the substrate. The bracket member includes vertical, horizontal and channel members integrally joined together for enabling a channel member to removably receive the rail member. The mold further includes a locking bolt for detachably securing the bracket member to the rail portion of the support member. A form member is detachably secured to the bracket member, the form member continuously extending outside the perimeter of the substrate and receives deformable material that ultimately solidifies; whereby, the substrate surface and the form member cooperate to configure a countertop that continuously extends upon and outside the perimeter of the substrate, thereby forming a countertop having an integrally joined overhang portion; whereupon, the reusable countertop mold is removed from the solidified countertop overhang portion and the rail portion.

13 Claims, 13 Drawing Sheets

(56) References Cited

U.S. PATENT DOCUMENTS

| | | | | |
|---|---|---|---|---|
| 2004/0222550 A1* | 11/2004 | Baldoni | ................ | B29C 33/40 264/138 |
| 2019/0337196 A1* | 11/2019 | Walter | ................ | B29C 39/10 |
| 2020/0307031 A1* | 10/2020 | Baldoni | ................ | B29C 39/10 |

* cited by examiner

REUSABLE COUNTERTOP MOLD FOR FORMING COUNTERTOP OVERHANGS

BACKGROUND OF THE INVENTION

1. Field of the Invention

This invention relates to countertop molds for forming top and edge portions ("overhangs") of countertops that extend outside the periphery of a cabinet substrate. The countertops are fabricated from a deformable countertop material poured upon the cabinet substrate and into the mold, whereupon, the deformable material solidifies and the reusable mold is removed from the solidified material. In particular, the present invention relates to a reusable countertop mold having multiple brackets that are removably secured to a rail portion of a cabinet member and form members detachably secured to the brackets, thereby allowing the mold to be separated from the rail portion of the cabinet member and solidified countertop material without damage to the rail portion and solidified countertop material extending outside the periphery of the cabinet substrate; whereupon, the separated mold is reused at another job site.

2. Background of the Prior Art

Mold assemblies for forming edge portions of custom countertops when pouring a countertop forming material into a recess formed by a countertop substrate and a mold assembly are well known. In particular, U.S. Pat. No. 7,001,558 ("558") provides a mold for producing a finished countertop on top of a countertop substrate having a top and an edge. The mold assembly of the 558 patent includes a configured inner surface portion that that receives a countertop forming material. The 558 mold assembly further includes a tab portion extending from the configured inner surface portion, the tab portion dimensioned to extend sufficiently to cover an edge portion and top portion of the countertop substrate, thereby positioning the inner surface of the mold assembly adjacent to the countertop substrate edge to ultimately form a countertop edge after a countertop forming material, engaging the mold assembly, sets or otherwise hardens. After the countertop forming material hardens, the configured inner surface portion is separated from the tab portion, which remains in place between the poured countertop and the countertop substrate.

The problem with the 558 patent is that the mold assembly cannot be reused with the same tap portion described in the patent. More specifically, once the inner surface portion is cut, sawed or otherwise separated from the tab portion, there is no tab portion to extend over the substrate top and edge to hold the inner surface portion adjacent to the countertop substrate edge. In the event that the inner surface portion of the mold assembly includes decorative designs or configurations that result in a relatively expensive mold assembly, once the inner surface portion is separated from the tab portion, the inner surface portion has only salvage value.

In application US 2019-0337196A1 published Nov. 7, 2019, a reusable counter mold is disclosed having a relatively rigid sheet with a continuously extending vertical portion integrally joined to a continuously extending horizontal base portion that horizontally inserts between a top edge portion of a cabinet and a bottom edge portion of a countertop substrate. The base portion includes recesses for enabling fasteners to insert through the countertop substrate, through the recesses and into the cabinet without engaging the base portion.

The problem with the published application disclosing a reusable mold is that the continuously extending mold is relatively difficult to extract from between the cabinet and the countertop substrate after a deformable material has solidified upon the substrate and the reusable mold. Another problem with the published reusable mold is that each side of the substrate to be covered with deformable material must have a continuously extending mold having the same length as the length of the substrate side to which the mold is removably secured, thereby preventing "side lines" in the deformable material. Thus, each side of the substrate requires a corresponding section of reusable mold cut to a predetermined length, resulting in the precut reusable mold section having limited reuse with another countertop forming project.

A need exists for a reusable mold assembly that includes multiple brackets that support a form member, whereby, both the brackets and form member are removed from the solidified deformable material without using a force that would damage the solidified deformable material or the reusable countertop mold.

SUMMARY OF THE INVENTION

It is an object of the present invention to provide a reusable countertop mold for forming a finished countertop on peripheral portions of a substrate that is secured to a floor mounted cabinet. A principal object of the present invention is to provide a reusable countertop mold removably secured to a rail portion of a cabinet member. A feature of the reusable countertop mold is multiple brackets removably secured to the rail portion of a cabinet member. Another feature of the reusable counter mold is a form member detachable secured to the multiple brackets. An advantage of the reusable countertop mold is that each of the multiple brackets are secured to a rail portion the cabinet member without damage to the rail portion. Another advantage of the reusable countertop mold is that the form member is cut or otherwise sized to required longitudinal and lateral dimensions at the location of a substrate selected to receive a deformable material, whereby, the deformable material covers the substrate and the sized base portion to ultimately form a solidified countertop that extends past the periphery of the substrate to form an overhang having a configuration corresponding to the reusable countertop mold.

Another object of the present invention is to provide a reusable countertop mold that includes a bracket member having integrally joined vertical and horizontal members that receive corresponding and detachably joined vertical and horizontal form members. A feature of the reusable mold is horizontal and vertical form members that are detachable joined to the bracket member. Another feature of the mold is that the horizontal and vertical form members can be cut at the site of the substrate to provide exact dimensions for the form relative to the dimensions of the substrate. An advantage of the mold is that the horizontal and vertical form members ultimately configure an overhang that compliments the countertop formed on the substrate.

Another object of the present invention is to provide a reusable countertop mold having a bracket member that includes a channel member that receives a bottom portion of a rail portion of a cabinet member. A feature of the channel member is a threaded aperture for rotationally receiving a locking bolt that inserts into the channel member, whereby, the locking bolt detachably secures the position of the channel member upon the rail portion of the support member. An advantage of the channel member is that the channel member is capable of receiving a myriad of rail portions having varying lateral dimensions, resulting in the reusable mold being reused for a myriad of projects.

Yet another object of the present invention is to provide a reusable countertop mold having a bracket member that includes a locking bolt with a boot portion that is rotationally secured to the locking bolt. A feature of the boot portion is a rubber portion that ultimately engages an inner wall of the rail member of the support member. An advantage of the rubber portion is that the rubber portion prevents damage to an inner wall of the rail portion when the locking bolt secures the channel member of the bracket member to the rail member.

Still another object of the present invention is to provide a reusable countertop mold having a relatively rigid offset member. A feature of the offset member is that the offset member is disposed between an outer wall of the rail member and an inner wall of the channel member. An advantage of the offset member is that the offset member prevents damage to outer wall of the rail member when the locking bolt secures the channel member to the rail portion.

Another object of the present invention is to provide a reusable countertop mold having a modified bracket member slidably secured between the substrate and the rail portion of the support member. A feature of the slidably secured modified bracket member is a sliding portion that is urged between the substrate and the rail portion of the support member. An advantage of the sliding portion is that a locking bolt is not required to secure the modified bracket member to the rail portion.

Another feature of the modified bracket member is at least one recess in the sliding portion that promotes the insertion of the fasteners through a substrate portion and into a cabinet member without engaging the sliding portion of the modified bracket member. Still another feature of the modified bracket member is that the recess includes a triangular configuration with a base dimension of the triangle having a length relatively longer than the diameter of the fasteners with the base of the recess being disposed at an inner edge of the sliding portion. An advantage of the sliding portion is that a locking bolt is not required to secure the modified bracket member to the rail portion. Another advantage of the sliding portion is that the triangular configured recesses provide sufficient error tolerance and guidance for the sliding portion in the event that the alignment between the recesses and corresponding fasteners is difficult to maintain as the sliding portion is forcibly urged between the substrate and the rail portion.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Figure 1:
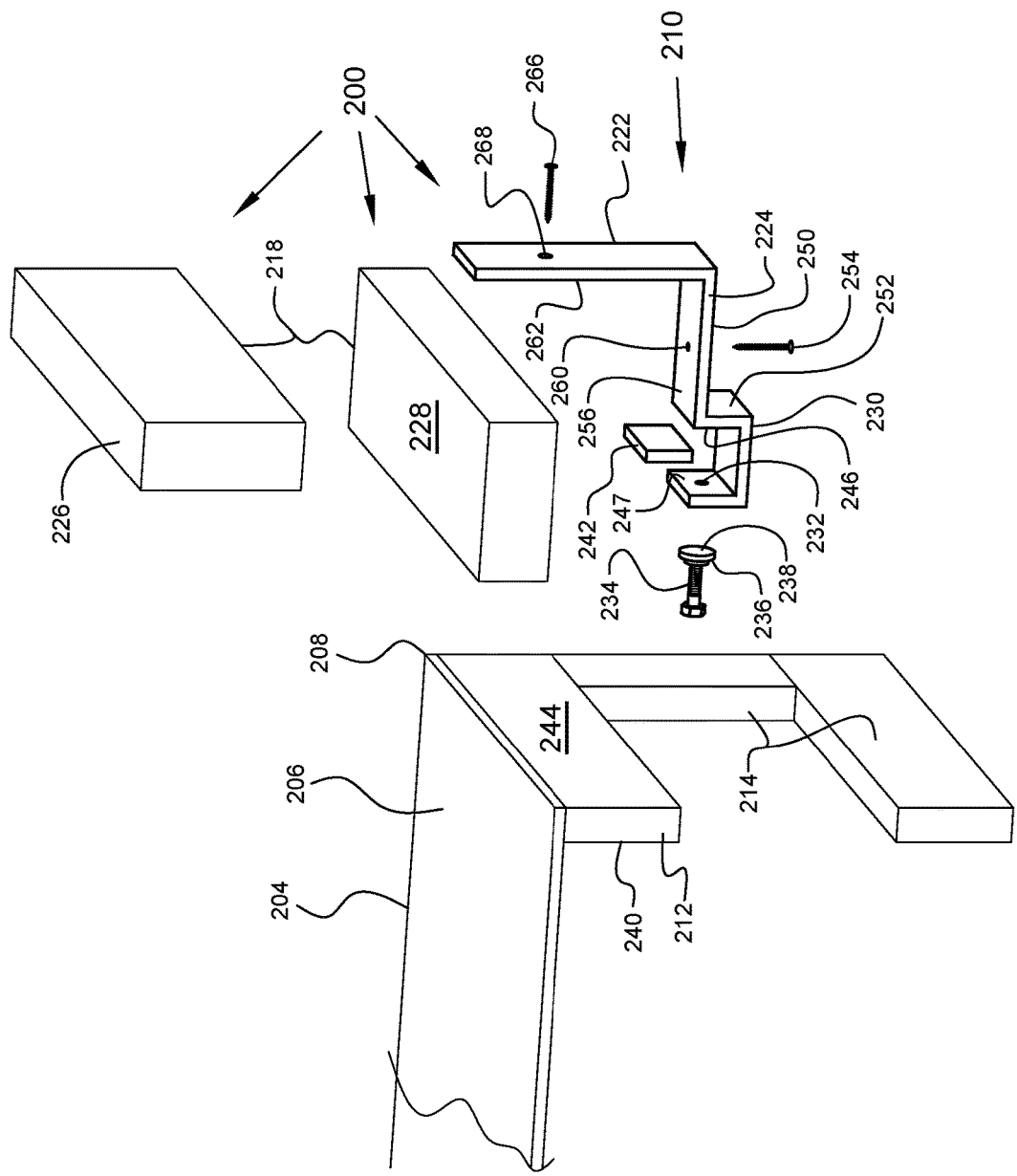
FIG. 1 is a left side-front perspective exploded view of a reusable countertop mold having a bracket with a detachably secured form member, the bracket secures to a rail portion of a cabinet member, the rail portion supporting a substrate that receives a deformable material in accordance with the present invention.

Referring now to FIGS. 1-7, a reusable countertop mold for forming a countertop upon and outside a substrate in accordance with the present invention is denoted as numeral 200. The mold or device 200 forms a countertop or cover 202 extending outside a substrate 204 surface 206 perimeter 208. The device 200 includes multiple reusable bracket members 210, fabricated from steel or similar rigid materials including polymers, detachably secured to cooperating rail portions 212 of a cabinet member 214 for a substantially horizontal substrate 204 that receives a deformable material that hardens or "sets-up" to form the countertop 202 upon a surface 206 of the substrate 204. The deformable material used to form the countertop 202 can include but not limited to polymers, concrete and grout. The device 200 further includes a reusable form member 218 detachably secured to each bracket member 210. The form member 218 continuously extends outside the perimeter 208 of the surface 206 of the substrate 204. The form member 218 is fabricated from two rigid (preferably wood) similar dimensioned and configured 2×4 vertical and horizontal form members 226 and 228 that receive deformable material that ultimately solidifies; whereby, the substrate surface 206 and the form member 218 cooperate to configure a countertop 202 that covers the substrate 204 and continuously extends outside the perimeter 208 of the substrate 204, thereby forming a solidified countertop 202 having an integrally joined overhang portion 220, whereupon, the reusable countertop mold 200 is removed from the solidified overhang portion 220 and the rail portions 212.

The rigid vertical and horizontal form members 226 and 228 can be fabricated from wood, polymers and similar materials capable of being cut to dimensions that enable the form members 226 and 228 to be secured to the bracket members 210 and to encase the perimeter of the substrate 206. The surfaces of the form members 226 and 228 are substantially planar to prevent a relatively high viscosity ("thick") deformable material from "leaking" between engaging surfaces of the form members 226 and 228, between engaging surfaces of the horizontal form member 228 and an outer wall 244 of the rail portion 212. When a deformable material having a relatively low viscosity ("thin") is disposed upon the form members 226 and 228, a gasket material fabricated from soft rubber can be disposed between the engaging surfaces to prevent the deformable material from seeping between the engaging surfaces. Further, the surfaces of the form member 226 and 228 engaging the deformable material can be modified, via methods well known to those of ordinary skill in the art, to include a configuration or design required to configure a corresponding surface of the deformable material engaging a respective surface of the form members 226 and 228. When the form members 226 and 228 are removed from the solidified deformable material, a configuration or design is permanently included in the corresponding surface of the overhang portion 220 of the countertop 202 that engaged the form members 226 and/or 228.

Each bracket member 210 includes a vertical plate or sheet member 222 ("vertical member") integrally joined to a horizontal plate or sheet member 224 ("horizontal member") that receive corresponding and detachably joined vertical and horizontal form members 226 and 228. Each bracket member 210 further includes a channel member 230 integrally joined to the horizontal member 224. The channel member 230 includes a gap defined by the distance separating two inner walls 246 and 247, whereby, the distance of separation is sufficient to enable the channel member 230 to receive a myriad of rail portions 212 having varying lateral dimensions, thereby allowing the reusable countertop mold 200 to be reusable for a myriad of cabinet members 214 well known to those of ordinary skill in the art. The channel member 230 further includes a threaded aperture 232 for rotationally receiving a locking bolt 234 that inserts into the channel member 230, whereby the locking bolt 234 detachably secures the position of the channel member 230 upon the rail portion 212 of the cabinet member 214 for the substrate 204 that receives deformable material.

The locking bolt 234 includes a boot portion 236 that is rotationally secured to the locking bolt 234. The boot portion 236 includes a rubber portion 238 permanently secure to the boot portion 236 via methods well known to those of ordinary skill in the art. The rubber portion 238 ultimately engages an inner wall 240 of the rail portion 212 of the support member 214 as the locking bolt 234 is tightened, whereby the rubber portion 238 prevents damage to the inner wall 240 of the rail portion 212 when the locking bolt 234 forcibly secures the channel member 230 to the rail portion 212. A relatively rigid offset member 242 fabricated from relatively rigid rubber is disposed between an outer wall 244 of the rail portion 212 and an inner wall 246 of the channel member 230, whereby, the offset member 242 prevents damage to the outer wall 244 of the rail portion 212 when the locking bolt 234 secures the channel member 230 to the rail portion 212. Further, the offset member 242 can be laterally sized to cooperate with the longitudinal dimension of the locking bolt 234, whereby, when a rail portion 212 is encountered having a lateral dimension that is proximate to the distance separating the inner walls 246 and 247 of the channel member 230, the lateral dimension of the offset member 242 can be decreased to a dimension that enables the rail portion 212 to insert into the channel member 230, thereby promoting the insertion of the offset member 242 between the outer wall 244 of the rail portion 212 and the inner wall 246 of the channel member 230.

The bracket member 210 of the countertop mold 200 may include a triangular configured bracket support member 248 (FIG. 2) when a relatively heavy quantity of deformable material 202 is disposed upon the horizontal form member 228. The bracket support member 248 is fabricated from metal, wood, hard polymer or similar rigid material that maintains a substantially triangular configuration when a force is directed on the legs of the triangle that form a right angle. The bracket support member 248 is dimensioned to engage substantially two-thirds of the surface area of a bottom wall 250 of the horizontal member 224, and substantially all of the surface area of an outer vertical wall 252 of the channel member 230 (see FIGS. 1 and 2); whereby, the bracket support member 248 maintains the relative positions of the vertical and horizontal members 222 and 224 of the bracket member 210, resulting in a peripheral surface for the solidified countertop 202 that is maintained level, thereby preventing stress cracks that would otherwise form in the overhang portion 220 adjacent to the perimeter 208 of the substrate 204.

The bracket support member 248 is secured to the bottom wall 250 of the horizontal member 224 of the bracket 210 via a fastening screw 254 that secures the horizontal form member 228 to the top wall 256 of the horizontal member 224 of the bracket member 210. The fastening screw 254 inserts through an aperture 258 in the support member 248, though an aligned aperture 260 in the horizontal member 224, and is forcibly rotated into the wooden horizontal form member 228. The wooden vertical form 226 member is secured to the inner wall 262 of the vertical member 222 of the bracket 210 via a fastener 266 inserted through an aperture 268 in the vertical member 222 and forcibly rotated, whereby, the fastener 266 ultimately inserts into the vertical member 222.

In operation, a reusable countertop mold 200 forms a countertop 202 having an integrally joined overhang portion 220. The mold 200 includes a predetermined quantity of reusable bracket members 210 dimensioned to secure first and second substantially vertical and horizontal form members 226 and 228 adjacent to a substrate 204 secured to a rail portion 212 of a cabinet member 214. The quantity and dimensions of the reusable bracket members 210 are determined via the peripheral dimensions of the substrate 212, the horizontal and vertical dimensions of the overhang portion 220, and the weight of the material ultimately disposed upon a form member 218 detachably secured to the bracket members 210. The preferred distance separating adjacent reusable brackets 210 is about three feet for a linear side of the substrate 204 perimeter 208, and about two feet for a curved or arcuate side of a substrate 204 perimeter 208 with at least one bracket member 210 secured to each side of the substrate 204 perimeter 208 irrespective of the length or quantity of the substrate 204 sides.

The dimensions of the reusable form member 218 are determined by the peripheral dimensions of the substrate 204, the horizontal and vertical dimensions of the overhang portion 220, and the weight of the material ultimately disposed upon the form member 218. As the dimensions of the overhang 220 increase and/or the weight of the overhang deformable material increases, the quantity and dimensions of the bracket members 210 increase; and the dimensions of the form member 218 increase. The quantity and dimensions of the bracket members 210, and the dimensions of form member 218 required for forming a selected countertop 202 and overhang portion 220 are well known to those of ordinary skill in the art. After installation of the reusable countertop mold 200, a preselected deformable material is disposed upon the substrate 204 and flows upon the form member 218 until a predetermined "thickness" for the deformable material is achieved; whereupon, the surface of the deformable material is configured to include a design pattern and/or leveled to a planar surface. After the deformable material has solidified, the mold 200 is removed and made available for new projects.

Figure 8:
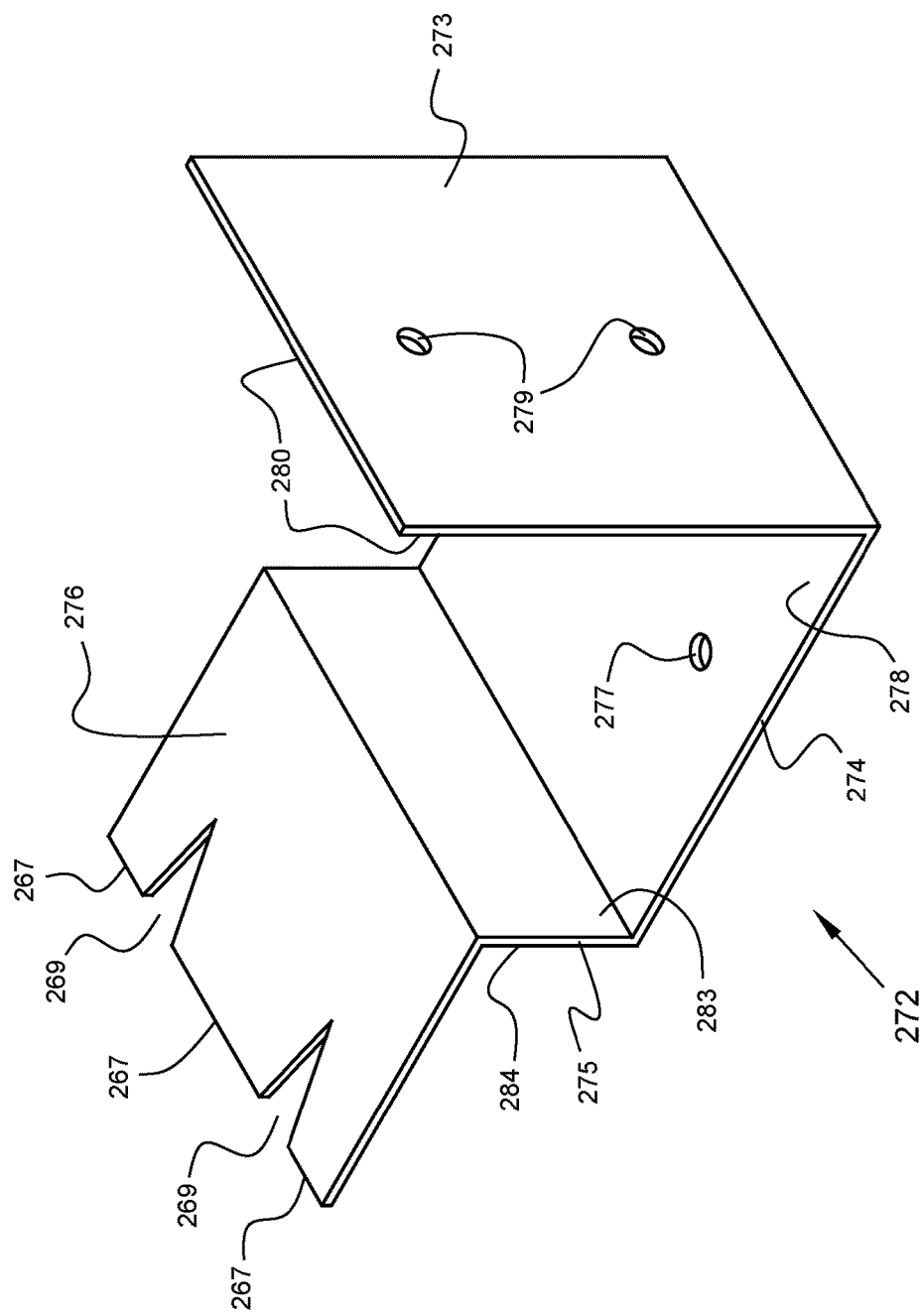
FIG. 8 is a perspective view of a first modified bracket for the bracket depicted in FIG. 1 in accordance with the present invention.
Figure 9:
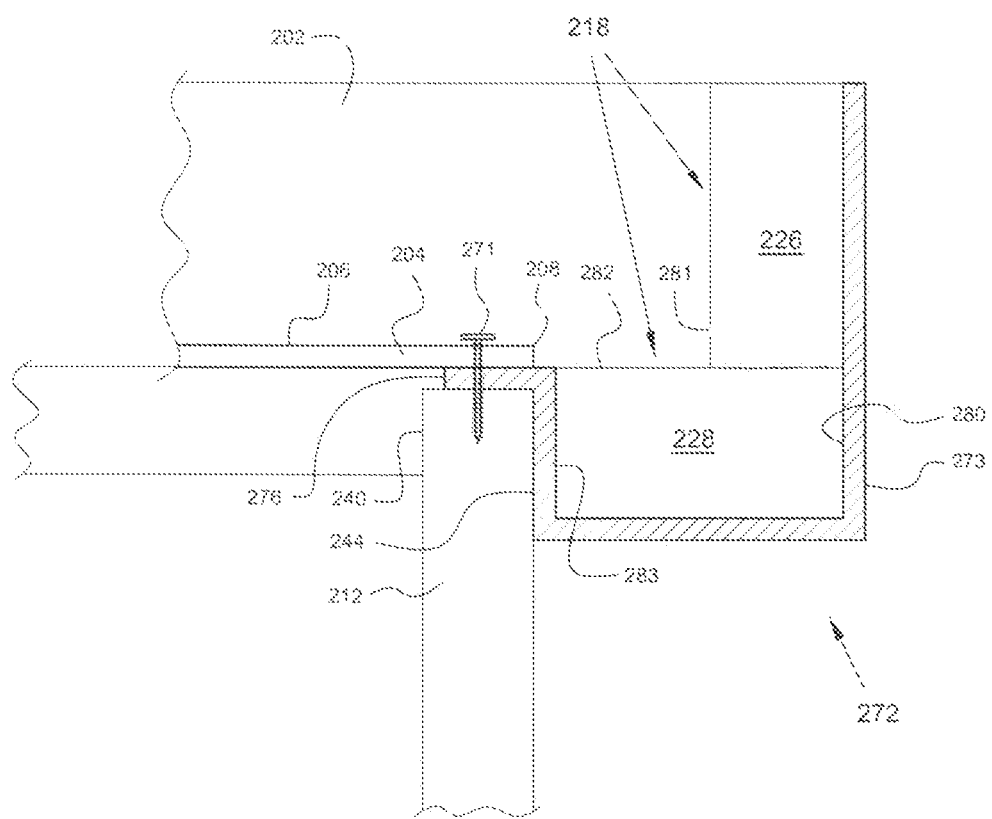
FIG. 9 is a left side section view of the first modified bracket inserted between and secured to the substrate and rail portion depicted in FIG. 1.

Referring to FIGS. 8 and 9, a first modified bracket for the bracket member 210 described above is depicted and denoted as numeral 272 in accordance with the present invention. The bracket 272 includes an outer vertical sheet or plate portion 273 integrally joined to an outer horizontal sheet or plate portion 274, whereby, a substantially ninety-degree angle is formed; and an inner vertical portion 275 integrally joined to the outer horizontal portion 274 and an inner horizontal portion 276, whereby, substantially ninety-degree angles are formed. The inner horizontal portion 276 includes an inner edge 267 sufficiently thin to promote insertion of the inner horizontal portion 276 between the substrate 204 and the rail portion 212 of the support member 214, until an outer vertical wall 284 of the inner vertical portion 275 engages the outer wall 244 of the rail portion 212. The inner edge 267 is longitudinally dimensioned to enable the inner horizontal portion 276 to insert between existing fasteners (not depicted) securing the substrate 204 to the rail portion 212.

In the event that the longitudinal dimension of the inner edge 267 results in the insertion edge 267 engaging an existing fastener 271 when the inner horizontal portion 276 is inserted between the substrate 204 and rail portion 212, at least one and preferably two recesses 269 are included in an edge portion of the inner horizontal portion 276 to receive the existing fastener 271 and avoid engagement between the existing fastener 271 and the inner horizontal portion 276 when the inner horizontal portion 276 is forcibly slid between the substrate 204 and the rail portion 212. Two recesses 269 are provided, when only one is required to receive a fastener 271 that would obstruct insertion of the inner horizontal portion 276, to provide a user of the modified bracket 272 two placement positions for the inner portion 276 relative to the fastener 271 when inserting the inner portion 276 between the substrate 204 and the rail portion 212.

The recesses 269 avoid engagement between the horizontal portion 276 and the existing fasteners by visually aligning one of the two recesses 269 with an exposed top portion of an existing fastener, then urging the edge portion of the horizontal portion 276 between the substrate 204 and the rail portion 212 until the outer vertical wall 284 of the inner vertical portion 275 engages the outer wall 244 of the rail portions 212. The recesses 269 include a triangular configuration with the base portion of the triangle having a length relatively longer than the diameter of the existing fastener, thereby providing sufficient tolerance to avoid engagement between the inner edge 267 and the fastener 271 should the insertion direction of the horizontal portion 276 become skewed. Further, the recesses 269 guide the insertion of the inner horizontal portion 276 should either side wall of the recess 269 engage the fastener 271. The distance between the base of the triangular recess 269 and the peak of the recess portion 276 is sufficient to allow the insertion of the inner horizontal portion 276 until the outer vertical wall 284 of the inner vertical portion 275 engages the outer wall 244 of the rail portion 212.

The outer horizontal portion 274 includes at least one and preferably two apertures 277 for receiving screws (not depicted) that secure a horizontal form member 228 (see FIG. 9) to a top horizontal wall 278 of the outer horizontal portion 274. The outer vertical portion 273 includes at least one and preferably two apertures 279 for receiving screws (not depicted) that secure a vertical form member 226 (see FIG. 9) to an inner vertical wall 280 of the outer vertical portion 273, whereby a side wall 281 of the vertical form member 226 perpendicularly engages a top wall 282 of the horizontal form member 228 (see FIG. 9). Further, the top wall 282 of the horizontal form member 228 perpendicularly engages an inner vertical wall 283 of the inner vertical portion 275, resulting in the securing of a form member 218 to a first modified bracket 272 after the inner horizontal portion 276 of the first modified bracket 272 is forcibly inserted between the substrate 206 and the rail portion 212.

In operation, a predetermined number of first modified brackets 272 are forcibly inserted between the substrate 206 and the rail portion 212 about the perimeter 208 of the substrate and vertical and horizontal form members 226 and 228 are detachable secured to the modified brackets 272, whereby, a continuous reusable countertop mold 200 with the modified brackets 272 continuously extends outside the perimeter 208 of the substrate 204 to receive a deformable material together with the substrate 204 that ultimately solidifies, thereby forming a countertop 202 having an integrally joined overhang portion 220, whereupon, the first modified bracket 272 is forcibly extracted from between the substrate 204 and the rail portion 212, and the form members 226 and 228 secured to the modified bracket 272 are forcibly separated from the countertop 202.

Figure 10:
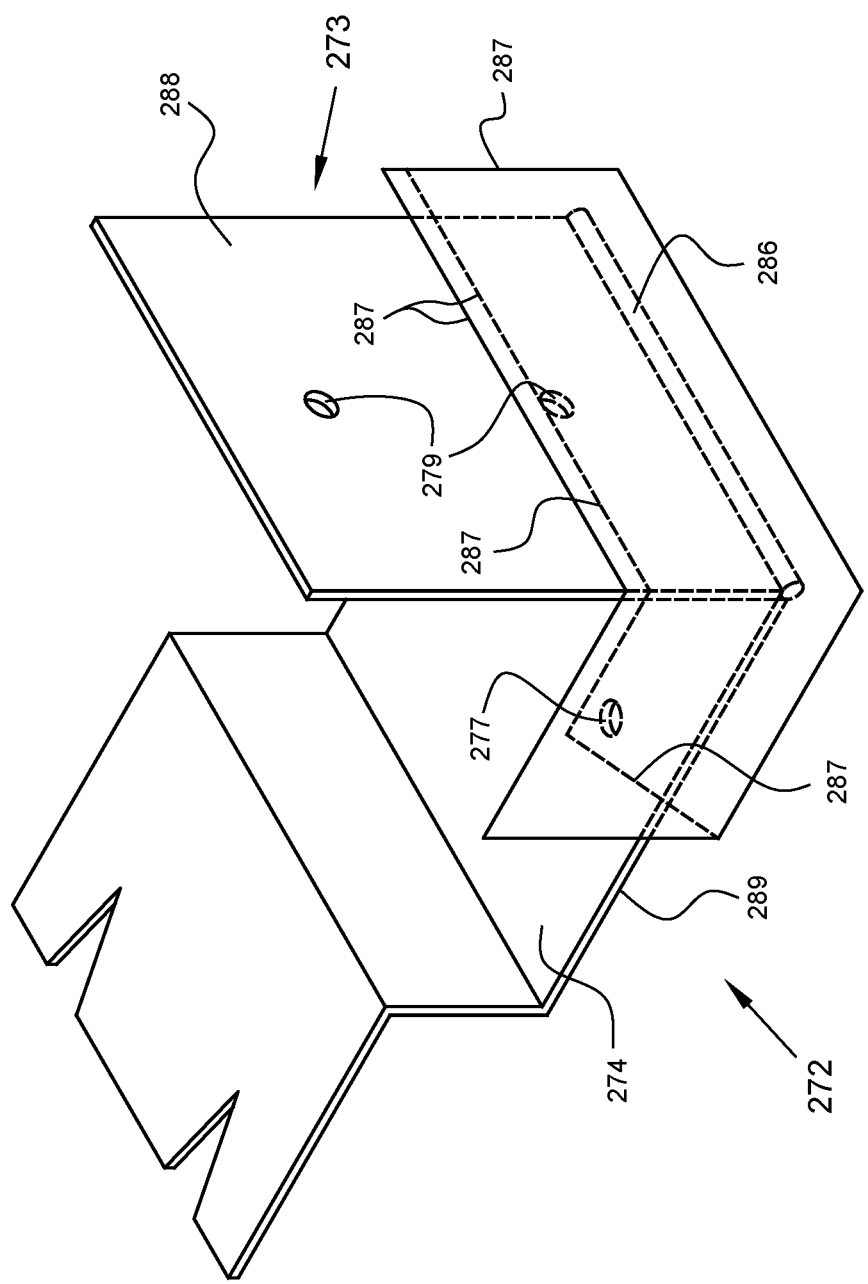
FIG. 10 is a perspective view of the first modified bracket of FIG. 8, but with a hinge member pivotally securing a horizontal member to an outer vertical member, the outer vertical member maintained in an upper position via a retaining member.

Referring to FIG. 10, a perspective view of the first modified bracket 272 is depicted with a hinge member 286 pivotally securing the outer vertical portion 273 to the horizontal portion 274 with the outer vertical portion 273 maintained in an upper position via a plastic retaining member 287. The retaining member 287 is secured to the horizontal form member 228 similarly to the method of securing the stiffener support 248 to the form member 228 depicted in FIG. 20, except that the retaining member 287 extends both horizontally and vertically to engage the outer wall 288 of the outer vertical portion 273 and the bottom wall 289 of the outer horizontal portion 274.

Figure 11:
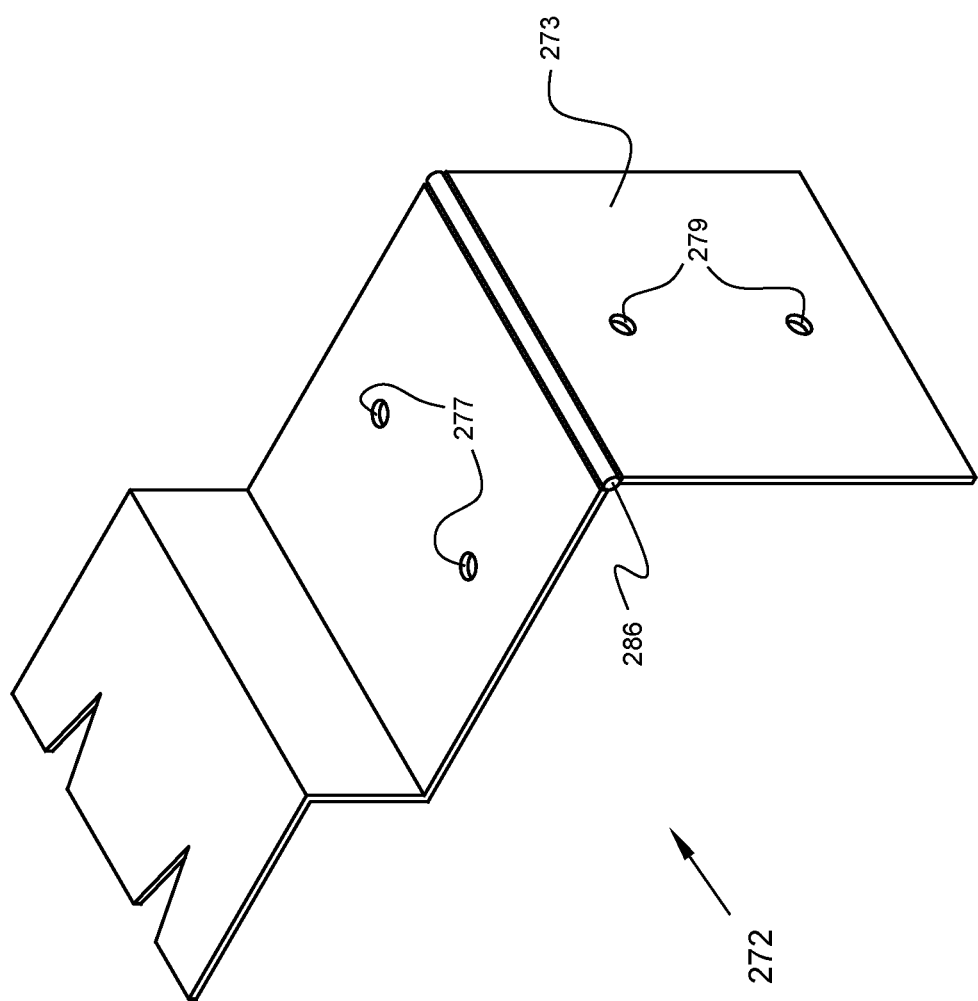
FIG. 11 is a perspective view of the first modified bracket of FIG. 10, but with the hinge member pivotally securing the outer vertical member in a lower position, the retaining member having been disconnected from the vertical member.

Referring to FIG. 11, a perspective view of the first modified bracket 272 is depicted with the retaining member 287 removed and the outer vertical portion 273 disposed in a lower position. The outer vertical portion 273 is maintained in an upper position when disposing the deformable material upon the substrate 204 and form member 218. After the deformable material has solidified to form a countertop 202, the screws inserted through apertures 277 and 279 are removed from the vertical and horizontal form members 226 and 228, the retaining member 287 removed, and the outer vertical portion 273 allowed to pivot downward into a lower position; whereupon, the vertical form member 226 is separated from the countertop 202 and horizontal form member 228, followed by the first modified bracket 272 and the horizontal form member 228 being forcibly removed from the countertop 202, thereby displaying a countertop 202 having an overlap portion 220 (see FIG. 2).

Figure 12:
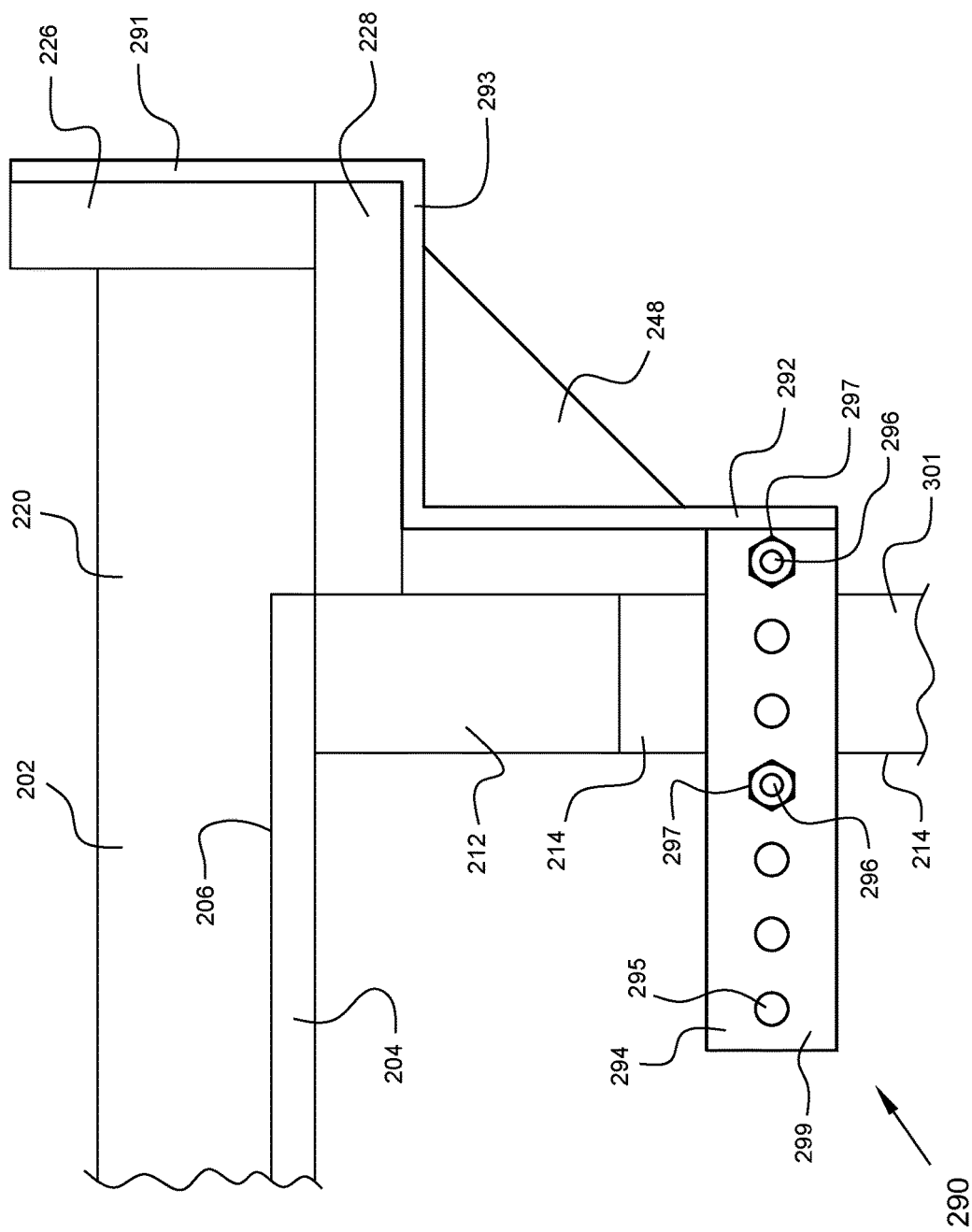
FIG. 12 is a left side elevation view of a second modified bracket for the bracket depicted in FIG. 1 secured to in accordance with the present invention.
Figure 13:
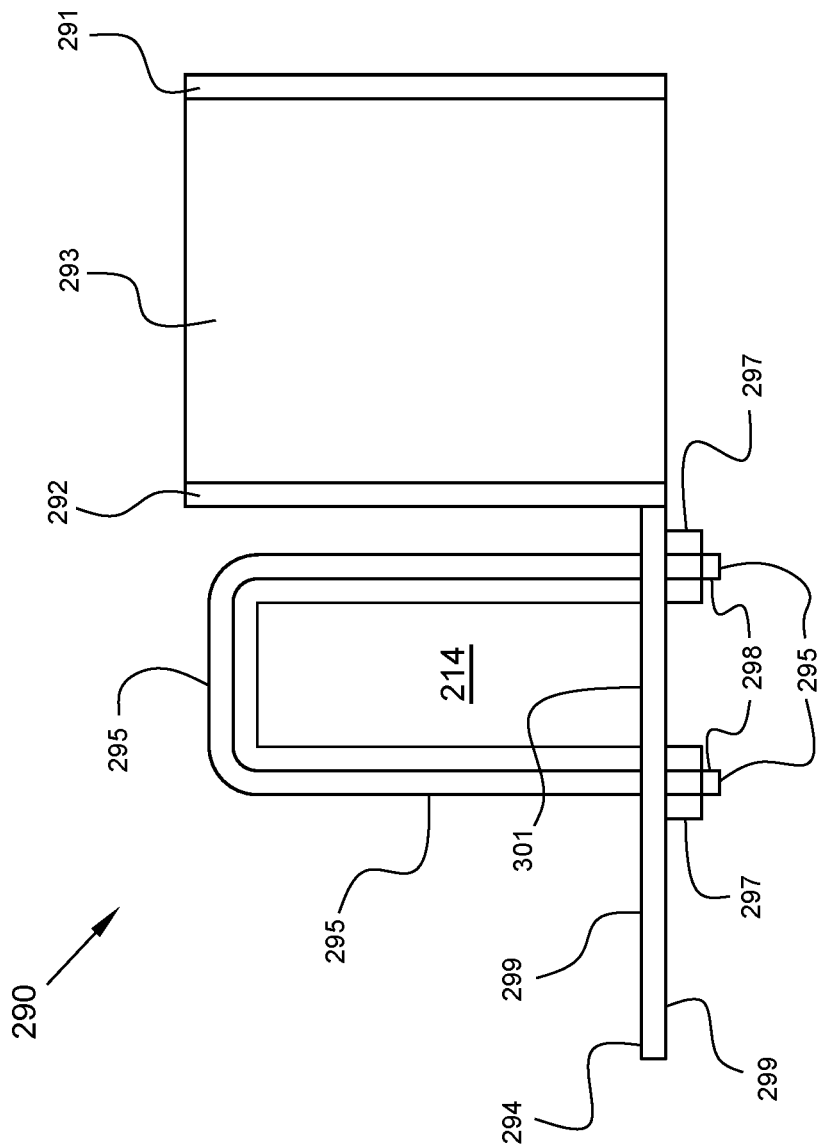
FIG. 13 is a top view of the second modified bracket of FIG. 11.

Referring to FIGS. 12 and 13, a left side elevation view and top view of a second modified bracket for the bracket 210 described above is depicted and denoted as numeral 290. The second modified bracket 290 includes an outer vertical sheet or plate portion 291, an inner vertical sheet or plate portion 292 and a horizontal portion 293 integrally joined between the outer and inner vertical portions 291 and 292, whereby, right angles are formed that position the outer vertical portion 291 in a substantially vertical position above the horizontal portion 292, and that positions the inner vertical portion 292 in a substantially vertical position below the horizontal portion 292.

Figure 2:
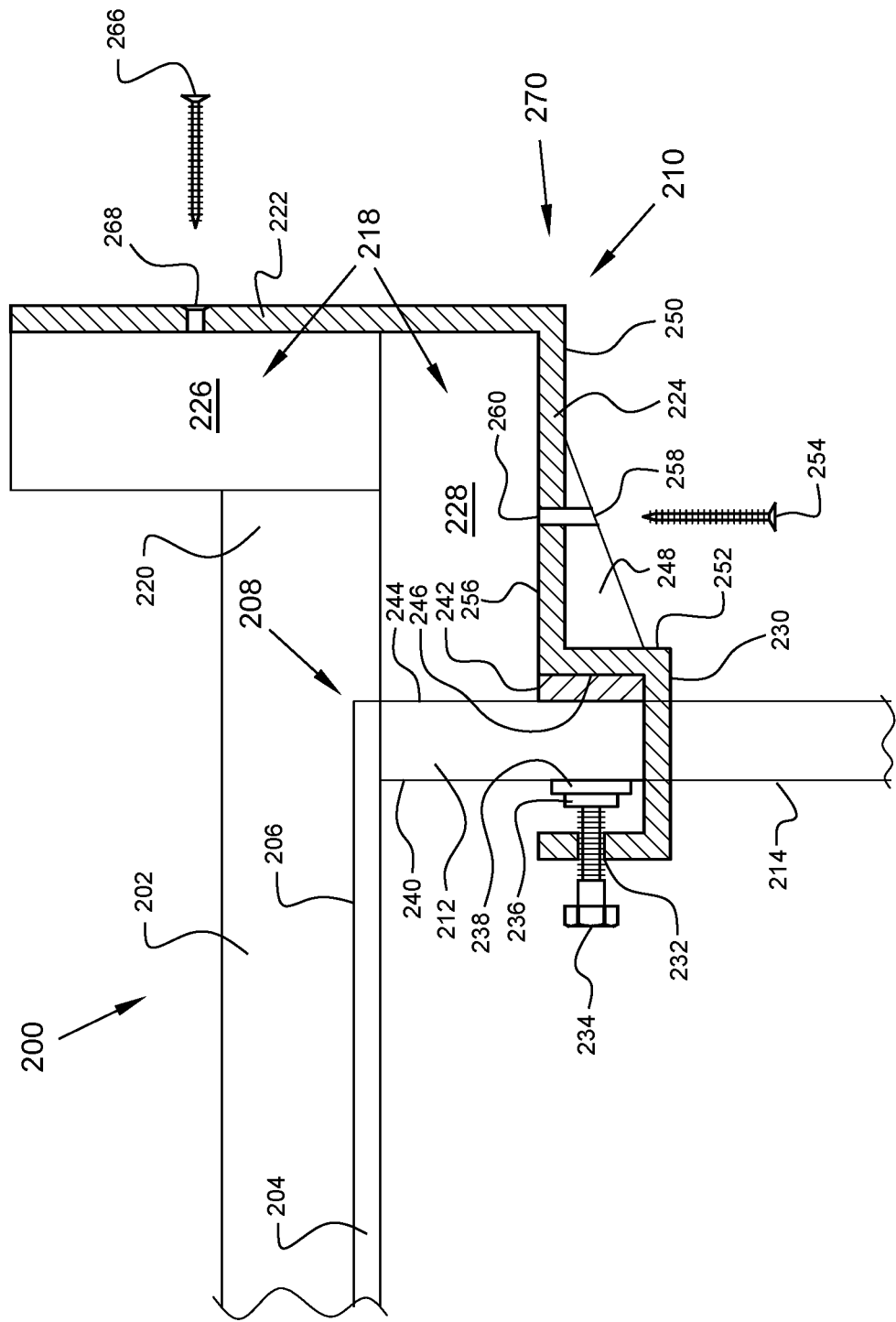
FIG. 2 is a left side sectional view of the bracket secured to the rail portion in FIG. 1 in accordance with the present invention.
Figure 3:
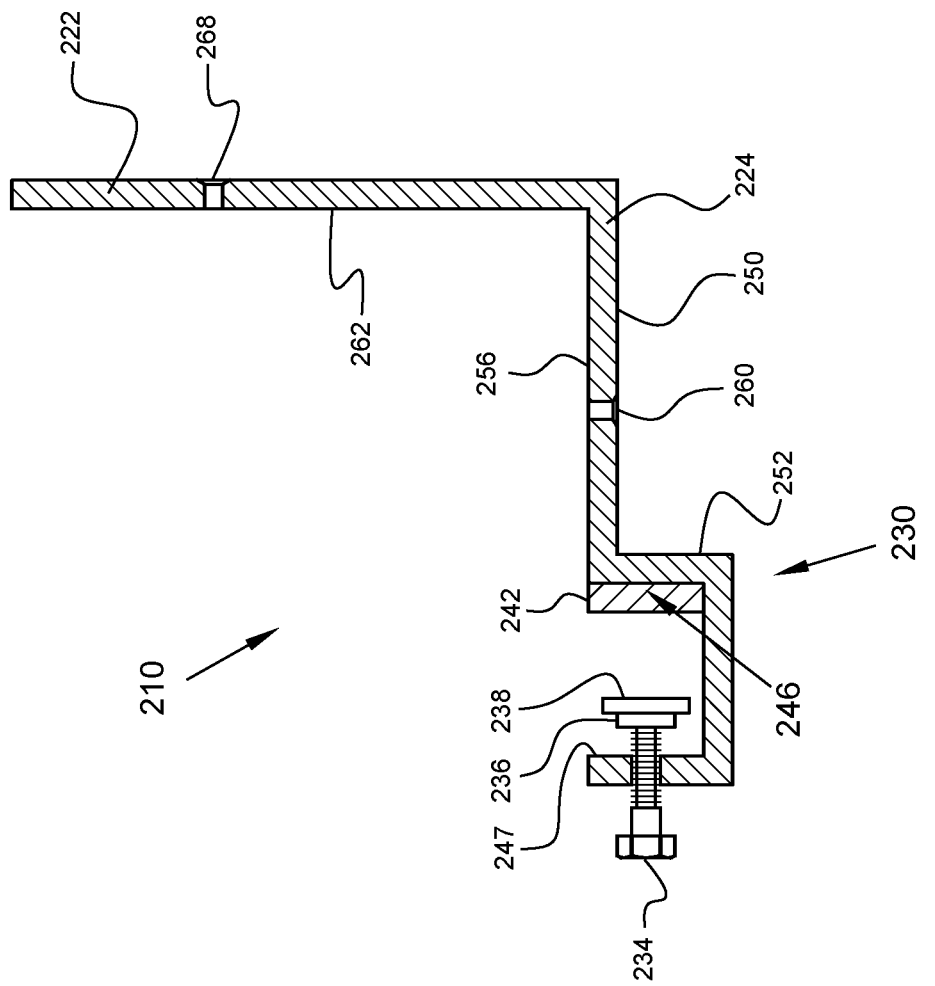
FIG. 3 is a left side sectional view of the bracket in FIG. 2.
Figure 4:
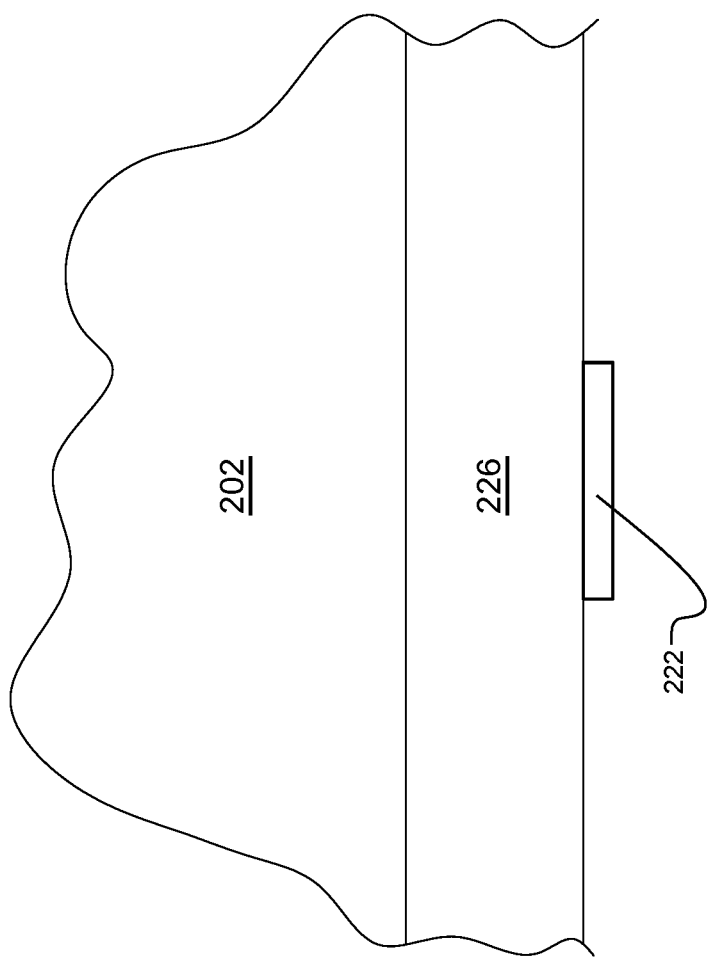
FIG. 4 is a top cut-away view of FIG. 2.
Figure 5:
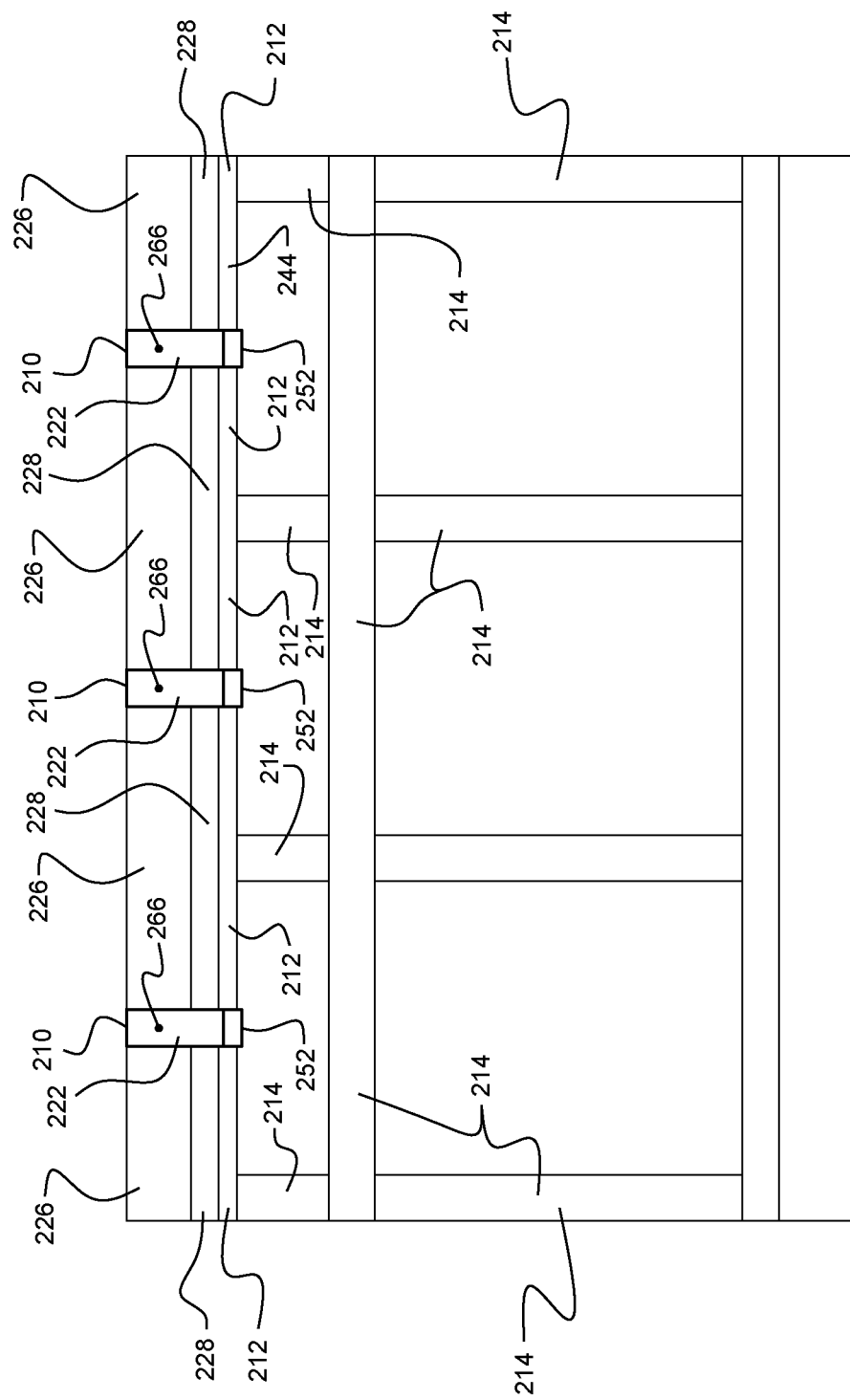
FIG. 5 is a front elevation view of multiple brackets secured to a rail portion with the brackets supporting the form member.
Figure 6:
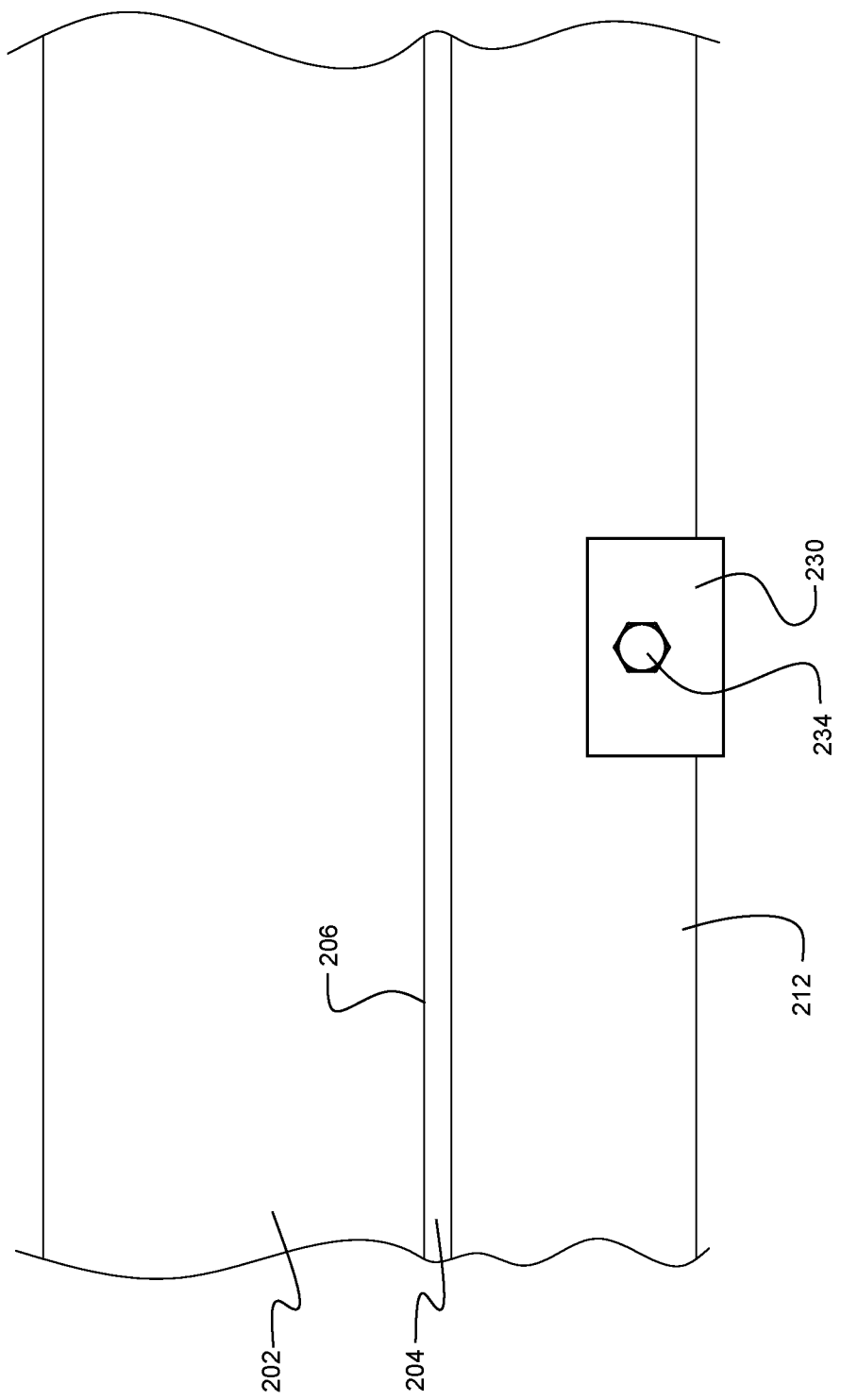
FIG. 6 is a cut-away back view of FIG. 2.
Figure 7:
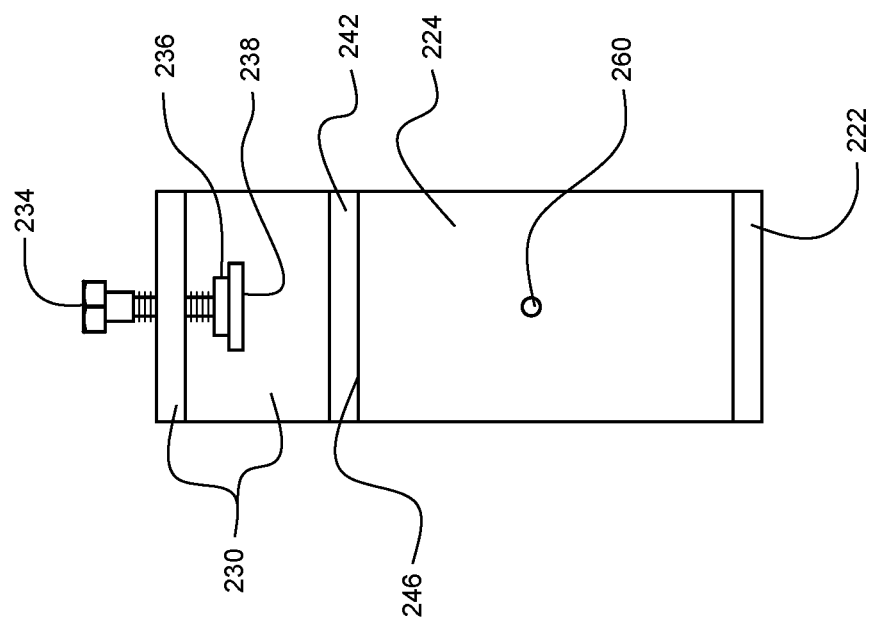
FIG. 7 is a top view of the bracket of FIG. 3.

The second modified bracket 290 further includes a bracket support member 248, as depicted and secured in FIG. 2 and described above, and a support plate 294 integrally and perpendicularly joined to the inner vertical portion 292, whereby, both opposing planar surfaces 299 of the plate 294 are parallel to the planar surface 301 of the cabinet member 214 for promoting maximum surface engagement between the planar surface 301 of the cabinet member 214 and one of the planar surfaces 299 of the support plate 294 irrespective of the orientation of the second modified bracket 290 relative to the cabinet member 214. The support plate 294 includes a plurality of apertures 295 longitudinally disposed for adjustably receiving a "U" bolt 295 that ultimately secures the support plate 294 to the cabinet member 214 of the cabinet member depicted in FIG. 1 and described above.

The U-bolt 295 is secured to the support plate 294 via two securing nuts 297, whereby, the U-bolt 295 is disposed about the cabinet member 214 and through the support plate 294; whereupon, threaded end portions 298 of the U-bolt 295 rotational receive the securing nuts 297, resulting in the U-bolt and the support plate 294 tightly secured to the cabinet member 214 and enabling the second modified bracket 290 to support a deformable material disposed upon the vertical and horizontal form members 226 and 228. A myriad of alternatives to the "U" bolt 295 for securing the support plate 294 or similar configured plate to the cabinet member 214, include but not limited to "C" configured clamps, fasteners inserted in a non-visible side of the support member 214, and duct tape.

The foregoing description is for purpose of illustration only and is not intended to limit the scope of protection accorded this invention. The scope of protection is to be measured by the following claims, which should be interpreted as broadly as the inventive contribution permits.

The invention claimed is:

1. A reusable countertop mold for forming countertop overhangs comprising:
   a plurality of reusable bracket members, each said reusable bracket member being detachably secured to a cooperating rail portion of a cabinet supporting a substantially horizontal substrate that receives a deformable material upon a surface of the substantially horizontal substrate, said plurality of reusable bracket members being disposed about a selected perimeter of the substrate, each said reusable bracket member includes integrally joined vertical and horizontal members, each said reusable bracket member includes a channel member integrally joined to said horizontal member of each said reusable bracket member; and
   a reusable form member detachably secured to said plurality of reusable bracket members, said form member continuously extending outside the perimeter of the substrate, said form member including a vertical form member detachably joined to each said vertical member of each said reusable bracket member, said form member including a horizontal form member detachably joined to each said horizontal member of each said reusable bracket member, said form member receiving the deformable material that ultimately solidifies; whereby, the substrate surface and said form member cooperate to configure a countertop that continuously extends outside the perimeter of the substrate, thereby forming a solidified countertop having an integrally joined overhang portion; whereupon, said reusable countertop mold is removed from the solidified countertop overhang portion and the cooperating rail portions of the cabinet.

2. The device of claim 1 wherein each said channel member includes a threaded aperture for rotationally receiving a locking bolt that inserts into each said channel member, whereby, each said locking bolt detachably secures the position of each said channel member upon the cooperating rail portion of the cabinet supporting the substantially horizontal substrate that receives the deformable material.

3. The device of claim 2 wherein each said locking bolt includes a boot portion that is rotationally secured to each said locking bolt.

4. The device of claim 3 wherein each said boot portion includes a rubber portion that ultimately engages an inner wall of the cooperating rail portion of the cabinet as each said locking bolt is rotationally inserted into each said channel member, whereby each said rubber portion ultimately engages an inner wall of the cooperating rail portion of the cabinet as the locking bolt is tightened, thereby securing each said channel member to the inner wall of the cooperating rail portion when each said rubber portion of each said locking bolt rotationally and forcibly engages the inner wall of the cooperating rail portion.

5. The device of claim 4 wherein an offset member is disposed between an outer wall of the cooperating rail portion and an inner wall of each said channel member, whereby, each said offset member prevents the outer wall of the cooperating rail portion from engaging said inner wall of each said channel member when said locking bolt rotationally secures said channel member to the cooperating rail portion.

6. The device of claim 5 wherein, each said reusable bracket member includes an offset member laterally sized to cooperate with a longitudinal dimension of said locking bolt, whereby the lateral dimension can be decreased to enable the cooperating rail portion of the cabinet to insert into said channel member.

7. The device of claim 1 wherein said plurality of reusable bracket members each said reusable bracket member includes a bracket support member disposed, whereby, a horizontal wall of each said bracket support member engages a bottom wall of each said horizontal member of each said reusable bracket member, and a vertical wall of each said bracket support member engages an outer vertical wall of each said channel member, whereby, each said bracket support member maintains the relative positions of each said horizontal and vertical members of each said reusable bracket member when deformable material is disposed upon an upper wall of each said horizontal form member.

8. The device of claim 1 wherein said vertical and horizontal members of each reusable bracket member of said plurality of reusable bracket members are pivotally joined.

9. The device of claim 1 wherein each said reusable bracket member is detachably secured between the substrate and the rail portion of the cabinet.

10. The device of claim 9 wherein each said reusable bracket member includes a sliding portion that is urged between the substrate and the rail portion of the cabinet.

11. The device of claim 10 wherein said sliding portion of each said reusable bracket member includes recesses that receive fasteners that maintain the position of the substrate upon the rail portion, whereby, said recesses prevent engagement between said sliding portion and the fasteners as the sliding portion is manually urged between the substrate and the rail portion of the cabinet.

12. The device of claim 11 wherein said recesses of said sliding portion of each said reusable bracket member includes a triangular configuration with a base dimension of the triangle having a length relatively longer than the diameter of the fasteners; and the base disposed at an inner edge of said sliding portion.

13. The device of claim 1 wherein each said reusable bracket member includes a lower portion of an outer vertical member integrally joined to an outer portion of a horizontal member and an inner portion of said horizontal member integrally joined to a channel member; whereby, said vertical and horizontal form members are detachably joined to said outer vertical and horizontal members of said reusable bracket member, and each said channel member is detachably secured to the rail member of the cabinet.

\* \* \* \* \*